(12) United States Patent
Chen et al.

(10) Patent No.: US 7,312,271 B2
(45) Date of Patent: Dec. 25, 2007

(54) SOLUTION MASTERBATCH PROCESS USING FINE PARTICLE SILICA FOR LOW HYSTERESIS RUBBER

(75) Inventors: Zhong-Ren Chen, Stow, OH (US); Sunji Araki, Tokyo (JP); William M. Cole, Clinton, OH (US); William Hergenrother, Akron, OH (US); Sandra Warren, Massillon, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/321,418

(22) Filed: Dec. 29, 2005

(65) Prior Publication Data
US 2007/0155890 A1    Jul. 5, 2007

(51) Int. Cl.
*C08K 3/36* (2006.01)
*C08C 2/00* (2006.01)

(52) U.S. Cl. ............ 524/493; 524/571; 524/572; 524/575; 523/209; 523/212; 523/351; 525/197

(58) Field of Classification Search ........ 523/209, 523/212, 351; 524/493, 571, 572, 575; 525/197
See application file for complete search history.

(56) References Cited

U.S. PATENT DOCUMENTS

| | | | |
|---|---|---|---|
| 5,929,156 A | 7/1999 | Fultz et al. | 524/492 |
| 5,985,953 A | 11/1999 | Lightsey et al. | 523/212 |
| 6,025,415 A | 2/2000 | Scholl | 523/213 |
| 6,277,902 B1 | 8/2001 | Scholl | 523/213 |
| 6,313,211 B1 | 11/2001 | Scholl et al. | 524/492 |
| 6,407,153 B1 | 6/2002 | Von Hellens | 524/188 |
| 6,420,456 B1 | 7/2002 | Koski | 523/213 |
| 6,437,050 B1 | 8/2002 | Krom et al. | 525/313 |
| 6,489,389 B1 | 12/2002 | Ohta et al. | 524/437 |
| 6,555,606 B1 * | 4/2003 | Agostini et al. | 524/264 |
| 6,713,534 B2 | 3/2004 | Goerl et al. | 523/333 |
| 6,720,369 B2 | 4/2004 | Goerl et al. | 523/215 |
| 6,736,891 B1 | 5/2004 | Bice et al. | 106/490 |
| 6,822,036 B1 | 11/2004 | Goerl et al. | 524/492 |
| 6,872,785 B2 | 3/2005 | Wang et al. | 525/313 |
| 6,894,089 B2 | 5/2005 | Mei et al. | 523/212 |
| 2003/0114577 A1 | 6/2003 | Yatsuyanagi et al. | 524/495 |
| 2003/0134943 A1* | 7/2003 | Labarre et al. | 523/351 |

OTHER PUBLICATIONS

Yatsuyanagi, et al., Effects of secondary structure of fillers on the mechnical properties of silica filled rubber systems, Polymer 42 (2001) 9523-9529.*

* cited by examiner

*Primary Examiner*—Fred Teskin
(74) *Attorney, Agent, or Firm*—Jenny L. Sheaffer; Meredith E. Hooker (57) ABSTRACT

Methods are provided for making a solution masterbatch containing a diene elastomer in an organic solvent and a reinforcing silica filler dispersed therein, comprising the steps of (a) mixing a precipitated silica having an average particle size substantially equivalent to an average particle size of a powdered silica, with a diene elastomer in a first organic solvent; and (b) desolventizing the mixture to form a solution masterbatch preparation. The use of such desolventized solution masterbatches in vulcanizable rubber compounds results in excellent processing characteristics with improved dispersion of fillers, including polymeric nanoparticles. The compounds also demonstrate improved properties, including reduced hysteresis.

38 Claims, 1 Drawing Sheet

SOLUTION MASTERBATCH PROCESS USING FINE PARTICLE SILICA FOR LOW HYSTERESIS RUBBER

BACKGROUND

The invention relates to a solution masterbatch of rubber and fillers for use in compounding rubbers.

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, improved rolling resistance, snow and ice traction, wet traction, improved wear and improved fuel economy for vehicles equipped with such tires.

The compounding of rubber by conventional means in mixers, such as the Banbury mixer, requires a number of process stages in which raw rubber material in the form of bales undergoes intimate mixing with reinforcing fillers, oils, plasticizers, vulcanization auxiliaries, and other common ingredients used in rubber compounding. Between the process stages, the mixtures are generally cooled on a batch-off system and then may be put into intermediate storage, prior to curing and tire building.

Such conventional rubber compounding processes are time- and energy-consuming, especially when silica is used as a reinforcing filler. In particular, silica particles contain polar silanol groups on the surface and tend to self-associate and reagglomerate extensively after compounding, leading to poor silica dispersion and a high compound viscosity. The strong silica filler network results in a rigid uncured compound that is difficult to process in extrusion and forming operations. Therefore, silica is typically chemically reacted with an organosiloxane silica coupling agent during the compounding process, requiring more time and energy for processing than compounds employing carbon black as a filler.

To address these problems, efforts have been made to predisperse fillers in dried masterbatches made from elastomer dispersions and aqueous dispersions of silica, prior to their use in compounding processes. Although masterbatches providing a mixture of organic solution polymerized elastomers and carbon black have been successful because of the hydrophobic nature of both the elastomer and the carbon black, the use of silica as a filler in a masterbatch has proven to be problematic because silica particles have hydrophilic surface characteristics, resulting in a two-phase system in which the silica is in an aqueous solution and the elastomer is in an organic solvent. Therefore, the use of silica in masterbatches has, for the most part, been limited to (a) mixing the silica with emulsion polymerized elastomers in aqueous solution, (b) hydrophobation of the silica prior to mixing with an elastomer solution-polymerized in an organic solvent, and/or (c) compatibilizing the elastomer for mixing with the silica in an aqueous phase. None of these processes for preparing silica-filled masterbatches has been satisfactory, in that a process such as (a) does not allow for the use of solution polymerized elastomers in organic solvents, and processes such as (b) and (c) have required time-consuming chemical reactions to compatibilize the reactants.

Therefore, there is still a need to provide solution masterbatches containing solution polymerized elastomers in organic solvents, and silica and other fillers, that are not complicated or expensive to prepare and that have excellent filler dispersion, to produce rubber compounds having low hysteresis properties and improved processability.

SUMMARY

A method is provided for making a solution masterbatch containing a diene elastomer in an organic solvent and a reinforcing silica filler dispersed therein, comprising the steps of (a) mixing a precipitated silica having an average particle size substantially equivalent to an average particle size of a powdered silica, with a diene elastomer in a first organic solvent; and (b) desolventizing the mixture to form a solution masterbatch preparation.

In each of the embodiments of the invention, the precipitated silica employed has an average particle size of about 20 to about 200 microns, suitably about 30 to about 100 microns, often about 50 microns. That is, if pelletized or granulated silica are used, they are first ground, crushed, pulverized, milled, or the like to the average particle size substantially equivalent to that of powdered silica.

In another embodiment, a method is provided for making a solution masterbatch containing a diene elastomer in an organic solvent and a reinforcing silica filler dispersed therein, comprising the steps of (a) mixing a precipitated silica having an average particle size substantially equivalent to an average particle size of a powdered silica, in a first organic solvent to form a silica slurry; (b) mixing the silica slurry with a diene elastomer in a second organic solvent; and (c) desolventizing the mixture produced in step (b) to form a solution masterbatch preparation.

In yet another embodiment, a method is provided for making a solution masterbatch containing a diene elastomer in an organic solvent and a reinforcing silica filler dispersed therein, comprising the steps of (a) mixing a precipitated silica having an average particle size substantially equivalent to an average particle size of a powdered silica, with a diene elastomer in a first organic solvent, wherein the silica is pre-treated with a silica coupling agent; and (b) desolventizing the mixture to form a solution masterbatch preparation.

In still another embodiment, a method is provided for making a solution masterbatch containing a diene elastomer in an organic solvent and a reinforcing silica filler dispersed therein, comprising the steps of (a) mixing a precipitated silica having an average particle size substantially equivalent to an average particle size of a powdered silica, in a first organic solvent to form a silica slurry, wherein the precipitated silica is pretreated with a silica coupling agent; (b) mixing the silica slurry with a diene elastomer in a second organic solvent; and (c) desolventizing the mixture produced in step (b) to form a solution masterbatch preparation.

The mixing steps of the foregoing method embodiments can include the optional substep of mixing the silica slurry and/or the silica/elastomer mixture with optional. additional ingredients prior to the desolventizing step. For example, the additional ingredients can include, but are not limited to, one or more additional fillers, one or more additional elastomers, a silica coupling agent, a surfactant, and the like.

A vulcanizable rubber compound having improved silica dispersion and containing a solution masterbatch produced according one or more of the method(s) of the invention is also provided. The vulcanizable rubber compound comprises a desolventized solution masterbatch comprising a diene elastomer, optionally having a terminal functional group that can react with silica, and a precipitated silica having an average particle size substantially equivalent to an average particle size of a powdered silica dispersed therein, wherein the precipitated silica is optionally pre-treated with a silica coupling agent; optionally an additional elastomer, wherein the total amount of the diene elastomer in the solution masterbatch plus the optional additional elastomer is 100 parts; optionally an additional reinforcing filler; optionally a process oil; and a cure agent. The amount of the silica in the solution masterbatch is about 10 phr to about 120 phr. The optional additional reinforcing filler can be, but is not limited to, precipitated silica, carbon black, clay, polymer microparticles, polymer nanoparticles, other types of nanoparticles, and combinations thereof.

The compound demonstrates a low Mooney viscosity and excellent processing characteristics, allowing for the reduced use of processing aids such as oil. The compound also demonstrates an increase in bound rubber, reduced filler flocculation after compounding, and reduced hysteresis properties, compared with compounds that are prepared by dry mixing of the ingredients. A tire having a component such as, but not limited to, a tire tread containing the vulcanized compound will have improved wear resistance, rolling resistance, excellent wet traction and superior handling.

DETAILED DESCRIPTION

The invention provides methods for making solution masterbatches, containing natural rubbers and/or solution polymerized diene elastomers and silica and/or other fillers and ingredients in organic solvents, that are not complicated or expensive to prepare and that have excellent silica filler dispersion, for use in the production of rubber compounds having low hysteresis properties and improved processability.

In particular, a method is provided for making a solution masterbatch containing a slurry of silica in an organic solvent without the need for pre-treatment to hydrophobize the hydrophilic silica, and intimate mixing of the silica slurry with a diene elastomer cement in an organic solvent, followed by desolventization of the solution masterbatch mixture. That is, in one embodiment, the silica slurry is formed first, followed by mixing with the diene elastomer cement in an organic solvent. In another embodiment the silica slurry is formed by directly mixing the silica in the diene elastomer cement while it is in an organic solvent.

In a non-limiting example, such a method for making such a solution masterbatch can comprise adding about one weight percent (wt %) to about 45 wt % or, suitably, about 5 wt % to about 30 wt % or, also suitably, about 10 wt % to about 20 wt % of the silica, to an organic solvent in a vessel; continuously stirring the mixture in the vessel until the silica is substantially evenly dispersed in the organic solvent to form a silica slurry; blending the silica slurry with a diene elastomer in an organic solvent; and desolventizing the elastomer/silica blend to form the solution masterbatch. Suitably, the weight percent of the silica in the solution masterbatch ranges from about 10 phr to about 120 phr and, also suitably, from about 20 phr to about 85 phr.

A suitable time period for mixing the silica with the organic solvent in the vessel and for the speed of stirring in order to provide excellent dispersion of the silica in the slurry is dependent on the type and size of vessel or reactor employed. As a non-limiting example, when silica is mixed with hexane in a 5 gallon reactor that is 12"×17"-316 stainless steel reactor (The Buckeye Fabricating Co.) at an agitation speed of 10-90 rpm for about one to about 30 minutes, the silica will be adequately dispersed in the solvent by visual examination or by other means such as, but not limited to, determining the wt % of silica in dried samples from the upper and lower parts of the slurry mixture. Suitable time periods and speeds of stirring to provide the desired silica dispersion using different vessels or reactors will be readily apparent to one or ordinary skill in the art from the teachings contained herein, without undue experimentation.

The dispersion of the silica and/or other fillers in the elastomer can be determined by such exemplary methods as measurement by the use of optical micrographs of samples of the rubber and/or by determining a dispersion index by well known methods.

The elastomer can be a solution- or emulsion-polymerized elastomer, or a natural rubber that has simply been dissolved in an organic solvent, or the elastomer can be present as the polymer cement in an organic solvent after solution polymerization is completed and prior to desolventization.

The embodiments of the invention can employ all types of precipitated silica, including pelletized, granulated and powdered silica. Examples of suitable silicas include, but are not limited to, precipitated amorphous silica, wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are most suitable. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$, being preferred, and the range of about 150 $m^2/g$ to about 220 $m^2/g$ being most preferred. The pH of the silica filler is generally about 5.5 to about 7 or slightly over, preferably about 5.5 to about 6.8.

For purposes of the embodiments of the present invention, the average particle size of the silica added to the organic slurry or added to the polymer cement in an organic solvent is substantially equivalent to the average particle size of powdered silica; that is, suitably about 20 to about 200 microns, suitably about 30 to about 100 microns, often about 50 microns. Therefore, it may be necessary to grind or otherwise crush pelletized or granulated silica to achieve the desired average particle size. Powdered silicas are most suitable in the method because these silicas have a fine particle size and do not usually require pre-grinding or crushing.

Suitable commercially available pelletized, granulated and/or powdered silicas include, but are not limited to, Hi-Sil® 190, Hi-Sil® 210, Hi-Sil® 215, Hi-Sil® 233, Hi-Sil® 243, Flo-Gard® SP, Flo-Gard® LP and the like, (PPG Industries), Ultrasil® VN2 and Ultrasil® VN3 (Degussa), Perkasil® KS 300-PD (Grace Davison), Zeosil® 1165MP (Rhone Poulenc) and others available from J. M. Huber Corporation, and the like. Most of these commercial silicas are available in pelletized, granulated and/or powdered form and, for purposes of the embodiments of the invention, the powdered silicas are most suitable. Powdered silicas that have been pre-surface treated with a silane are also commercially available and include, but are not limited to, Ciptane® 255 LD and Ciptane® LP (PPG Industries) that are powdered silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Ciptane® I and Ciptane® TM are pelletized versions of the powdered pre-treated silicas above.

In the methods according to the invention, the use of powdered silica that has been pre-treated with a silica coupling agent is particularly suitable in the solution masterbatches to provide improved dispersion of the silica in the elastomer. The silica coupling agents can be organosiloxanes, such as those described above, or other types of silica coupling agents described below. Pre-treatment of the silica with a silica coupling agent reduces the amount of alcohol released into the environment and/or remaining in the rubber after compounding. As the present trend in rubber-making technology continues toward the use of higher silica loadings in rubber compounds, there is a challenge to contain levels of environmentally released alcohol. There is also a need to reduce the amount of alcohol retained in the compounded product, in order to increase production and decrease costs.

In each of the embodiments according to the invention, the silica in the silica slurry or silica/elastomer slurry can be mixed with one or more additional fillers, and/or one or more additional polymers, and/or one or more surfactants, and/or one or more silica coupling agents, prior to desolventizing the solution masterbatch. Additional fillers added to the silica slurry can be reinforcing fillers, non-reinforcing fillers, polymer microparticle fillers, polymer nanoparticle fillers, other types of nanoparticle fillers, and mixtures thereof. Suitable additional reinforcing fillers include, but are not limited to, carbon black, silicates such as calcium silicate, aluminum silicate, magnesium silicate and the like, clay (hydrous aluminum silicate), talc (hydrous magnesium silicate), mica, and the like. Suitable non-reinforcing fillers including, but not limited to, titanium dioxide, urea, sodium sulfate, and the like, are known in the art of rubber compounding.

Carbon black is a particularly suitable reinforcing filler for use in the solution masterbatch. The carbon black can be present in the solution masterbatch in amounts ranging from about one to about 50 phr, about five to about 35 phr, and the like. The carbon blacks can include any of the commonly available, commercially-produced carbon blacks. Such carbon blacks can have a surface area (EMSA) of at least 20 $m^2/g$ and, suitably, at least 35 $m^2/g$ up to 200 $m^2/g$ or higher. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Suitably, unpelletized carbon black provides a greater dispersion of the carbon black in the polymer.

The preparation of suitable polymer microparticle fillers and polymer nanoparticle fillers is disclosed in U.S. Pat. No. 6,872,785, the entire disclosure of which is hereby incorporated by reference.

Surfactants that are soluble in organic solvents can be added to the silica slurry and/or silica slurry/polymer mixture. Surfactants tend to stabilize the dispersion of the silica in the polymer. Suitable surfactants include, but are not limited to, polyethylene glycol type surfactants such as fatty acid-ethylene oxide adducts, polyhydric alcohol fatty acid ester-ethylene oxide adducts, polyether-modified silicones, polypropylene glycol-ethylene oxide adducts and the like. Examples of polyhydric alcohol type surfactants are fatty acid esters of glycerol, fatty acid esters of pentaerythritol, fatty acid esters of hydrogenated and non-hydrogenated $C_5$ and $C_6$ sugars (e.g., sorbose, mannose, and arabinose) including, but not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maze® 80.

Polyoxyethylene derivatives of fatty acid esters of hydrogenated and non-hydrogenated $C_5$ and $C_6$ sugars are also useful surfactants and can include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals.

A useful amount of any of these surfactants is about 0.1% to about 25% by weight based on the weight of the silica, with about 0.5% to about 20% by weight being suitable, and about 1% to about 15% by weight based on the weight of the silica also suitable.

Other ingredients can include additives that are non-reactive with the polymer but act as silica/polymer stabilizing agents. Such additives are well known as silica shielding agents. In this regard, silanes such as alkyl alkoxysilanes are particularly suitable. However, other silica shielding agents can be used, without limitation.

Silica coupling agents can include, but are not limited to, bifunctional silica coupling agents having a moiety (e.g., an alkoxysilyl group) reactive with the silica surface, and a moiety (e.g., a mercapto, amino, vinyl, epoxy or sulfide group) that binds to the elastomer. Well known examples of such silica coupling agents are mercaptosilanes, bis(trialkoxysilylorgano) polysulfides, such as bis(3-triethoxysilylpropyl) tetrasulfide which is sold commercially as Si69 by Degussa, and 3-thiocyanatopropyl trimethoxysilane. These bifunctional silica coupling agents offer excellent coupling between rubber and silica, resulting in rubbers having improved wet ice skid resistance, rolling resistance and tread wear. Particularly suitable silica coupling agents for use in the embodiments of the invention are pre-reacted with the silica. For example, commercially available powdered silicas that have been pre-surface treated with a silane are suitable and include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. As described above, granulated and/or pelletized versions of these pre-treated silicas can also be employed if they are pre-crushed to the required average particle size.

Organic solvents for use in preparing the silica-containing slurry and/or the silica-containing solution masterbatch can include, but are not limited to, hydrocarbon solvents comprised of one or more aromatic, paraffinic or cycloparaffinic compounds. These solvents will normally contain from about 4 to about 10 carbon atoms per molecule and will be liquid. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture. The solvent for the silica and the solvent for the elastomer may be the same or different from each other. However, it is preferred that the individual solvents are miscible with each other.

The present invention can be used in conjunction with any solution or emulsion polymerized elastomer. For example, any dried emulsion polymerized elastomer can be mixed in an organic solvent and be suitable for use in the embodiments of the invention.

Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the some suitable polymers, copolymers or terpolymers having 1,2-microstructure content of from about 25 to 65 percent, based upon the diene content. The elastomeric copolymers are suitably random copolymers which result from simultaneous copolymerization of the monomers A and B with randomizing agents, as is known in the art.

Exemplary polymers for use in a solution masterbatch or in a mixture of a solution masterbatch and a dry mix vulcanizable elastomeric compound according to the invention include, but are not limited to, polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, dialkylimido-lithium and cycloalkylimido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms and, suitably, from about 2 to about 8 carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are most suitable. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. Typical and suitable organo-lithium initiators are n-butyl lithium, tributyl tin lithium and "in situ" produced lithium hexamethyleneimide initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. As discussed above, the polymerization solvent can be the same or different from the solvent used to prepare a silica slurry. Various techniques for polymerization, such as semi-batch and continuous polymerization can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2-di(tetrahydrofuryl) propane, dipiperidyl ethane, hexamethyl phosphoramide, N-N -dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown"ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is suitable to maintain the peak temperature at from about 50° C. to about 150° C. and, also suitably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terminated with an alkoxysilane functional group, as discussed herein below, are subsequently treated with alcohol or other quenching agent.

One way to quench the polymerization reaction is to employ a protic quenching agent to give a hydrogen terminated polymer chain. Quenching can be conducted in water, steam or an alcohol such as isopropanol, or any other suitable method. Termination can also be conducted with a functional terminating agent, resulting in a monofunctional polymer. Any compounds providing terminal functionality (i.e., endcapping) that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof. Further examples of reactive compounds include the terminators described in co-owned U.S. Pat. Nos. 5,521,309 and 5,066,729, the subject matter of which, pertaining to terminating agents and terminating reactions, is hereby incorporated by reference. Other useful terminating agents can include those of the structural formula $(R)_a ZX_b$, where Z is tin or silicon. Z is most suitably tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane (TEOS), $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is desirable, it is further desirable to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 25 percent tin coupling. That is, about 25 percent of the polymer mass after coupling is of higher molecular weight than the polymer before coupling as measured, for example, by gel permeation chromatography. Suitably, before coupling, the polydispersity (the ratio of the weight average molecular weight to the number average molecular weight) of polymers, which can be controlled over a wide range, is from about one to about 5, one to about 2 and, also suitably, one to about 1.5.

As noted above, various techniques known in the art for carrying out polymerizations can be used to produce elastomers polymers suitable for use in the vulcanizable elastomeric compositions, without departing from the scope of the present invention.

Subsequent to polymerization of the elastomer, while it is still in the organic solvent, the elastomer can be mixed with the silica slurry. Alternatively, the silica can be mixed directly with the elastomer in the solvent. Furthermore, the silica slurry can be mixed with any or all of the ingredients described above, prior to mixing with the elastomer. Alternatively, multiple fillers and/or multiple elastomers can be mixed together in one pot. The "alternative" mixtures, however, are meant to be descriptive and not limiting, for, as many ingredients can be mixed with the silica and/or elastomer(s) to form a solution masterbatch, in any combination whatsoever, with as many steps and order of steps, as desired, without limitation.

The final step of the preparation of the solution masterbatch is desolventization of the mixture. Desolventization may be accomplished by any known method including, but not limited to, drum drying, extruder drying, vacuum drying, spray drying, and the like, and steam desolventization. If steam desolventization is used, oven drying can be desirable.

The conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds according to the invention will have improved silica dispersion and can comprise (a) a desolventized solution masterbatch comprising a diene elastomer and silica having an average particle size of about one to about 20 microns dispersed therein, wherein the weight percent of the silica in the solution masterbatch ranges from about 10 phr to about 120 phr; (b) optionally an additional elastomer, wherein the total amount of the diene elastomer in the solution masterbatch plus the optional additional elastomer is 100 parts; (c) optionally an additional reinforcing rfiller, selected from the group consisting of precipitated silica, carbon black, clay, polymer microparticles, polymer nanoparticles, other types of nanoparticle fillers, and combinations thereof; (d) optionally about 2 to about 15 percent by weight, based on the total weight of the silica, of a silica coupling agent; (e) optionally a process oil; and (f) a cure agent. The resulting compound will demonstrate a low Mooney viscosity and excellent processing characteristics, allowing for the reduced use of processing aids such as oil. The compound also will demonstrate an increase in bound rubber, reduced filler flocculation after compounding, and improved hysteresis properties, compared with compounds that are prepared by dry mixing of the ingredients.

It is readily understood by those having skill in the art that the rubber compound would be compounded by methods generally known in the rubber compounding art, such as mixing the solution masterbatch with various additional vulcanizable polymer(s), various additional reinforcing fillers, and various commonly used additive materials such as, for example, curing agents, activators, retarders and accelerators, processing additives, such as oils, resins, including tackifying resins, plasticizers, pigments, non-reinforcing fillers, fatty acid, zinc oxide, waxes, antioxidants, antiozonants, peptizing agents, and the like. As known to those skilled in the art, depending on the intended use of the sulfur vulcanizable and sulfur vulcanized material (rubbers), the additives mentioned above are selected and commonly used in conventional amounts., in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants, comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Desirably, the sulfur vulcanizing agent is soluble sulfur or a mixture of soluble and insoluble polymeric sulfur. The sulfur vulcanizing agents are used in an amount ranging from about 0.1 to about 10 phr, desirably about 1.5 to about 7.5 phr, with a range of about 1.5 to about 5 phr being most desirable.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazole, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr and, also suitably, about 0.2 to about 3 phr.

Pneumatic tires having an improved tensile mechanical and dynamic viscoelastic properties, and comprising at least one component produced from the sulfur-vulcanized elastomeric compound of the invention, according to the embodiments of the invention will exhibit will have improved wear resistance, rolling resistance, excellent wet traction and superior handling.

EXAMPLES

The following examples illustrate methods of preparation of representative solution masterbatch compounds (SMBs) containing polymer(s), silica, and/or other ingredients, including other fillers. Further illustrated are methods for preparation of organic dispersions/slurries of fine particle silica and the use of such silica slurries in SMBs. Further provided are rubber compounds containing such SMBs. The examples are not intended to be limiting, as other organic dispersions of silicas and SMBs can be prepared according to the described methods. Furthermore, polymers other than those illustrated can be employed. All the methods are exemplary only and other methods for preparing the silica slurries, SMBs and other rubber compounds, including different compounding formulations, can be determined by those skilled in the art without departing from the scope of the invention herein disclosed and claimed.

Physical Testing of Rubber Compounds

In the examples below, the green stocks (i.e., the stocks obtained after the final mixing stage, prior to curing) were characterized as to Mooney viscosity and cure characteristics. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ is the time required for the viscosity to increase by five Mooney units during a Mooney scorch measurement. It is used as an index to predict-how fast the compound viscosity will increase during processing (e.g., during extrusion).

After compounding, the final stocks were sheeted and cured. A Monsanto Rheometer MD2000 was used to characterize the stock curing process, at a frequency of 100 cycles per minute, and a strain of 7% at 171° C. for 30 minutes. The measurements $t_{S2}$ and $t_{90}$ are the times taken for an increase in torque of 2% and 90%, respectively, of the total torque increase during the cure characterization test. These values are useful in predicting the speed of the viscosity increase ($t_{S2}$) and the cure rate during the cure process ($t_{90}$).

The Payne effect measurement ($\Delta G'$) and the tan $\delta$ at 7% strain were obtained from strain sweep tests of the cured stocks conducted at 65° C. at a frequency of 3.14 radians/second, and a strain sweeping from 0.25% to 14.75%. In some of the tables below, where indicated, the $\Delta G'$ and the tan $\delta$ at 5% strain were obtained from strain sweep tests of the cured stocks, conducted at 60° C. at a frequency of 31.4 radians/second, and a strain sweeping from 0.25% to 14.75%.

The dynamic viscoelastic properties of the cured stocks were also measured by temperature sweep tests. The measured viscoelastic properties were the storage modulus (G' @−20° C.) tan $\delta$@0° C. and tan $\delta$ at 50° C. Temperature sweep tests were conducted at a frequency of 31.4 radians/second using 0.5% strain for the temperatures ranging from −100° C. to −10° C. and 2% strain for the temperatures ranging from −10° C. to +100° C. The strain and temperature sweep tests employed a Rubber Process Analyzer (Alpha Technologies, Inc.)

The ring tensile properties for the cured stocks were measured using the standard procedure described in ASTM-D 412 at 25° C. The tensile test specimens were round rings with a diameter of 0.05 inches and a thickness of 0.075 inches. A gauge length of 1.0 inches was used for the tensile test. The measurements were of mechanical strength ($T_b$ and toughness) and elongation at break $E_b$).

The micro dumbell tensile properties were measured using the standard procedure described in ASTM-D412 at 23° C., 100° C. and/or 170° C. with a micro dumbell having a thickness of 0.075 inches.

The ring tear test was conducted according to ASTM-624-B at 171° C. or 100° C., using a nick die having an inside diameter of 44.0 mm +/−0.2 mm, an outside diameter of 57.5 mm +/−0.2 mm and a thickness of 0.100 inches.

Example 1

Preparation of Solution Masterbatches Using a Silane Pre-Treated Powdered Silica with and without the Addition of a Surfactant (SMB-1 and SMB-2)

The silica employed was Ciptane® LP (powdered silica pre-treated with a mercaptosilane, having substantially no trialkoxysilane present and containing 0.5% SH groups, from PPG Industries). The mean particle size of the Ciptane® LP was 59.95 microns, as measured by a particle analyzer (Saturn DigiSizer™ 5200 high definition particle size analyzer, Micromeritics, Norcross Ga.), using ultrasound to break down weak aggregates. The median particle size was 41.31 microns.

To a one gallon stirring reactor was added 150 grams of Ciptane® LP and 1000 grams of hexane. After stirring at room temperature for 30 minutes to form a silica slurry, 1688.2 grams of styrene-butadiene rubber (SBR) polymer cement (17.77 wt % in hexane) was added to the same container. (The polymerization of the SBR was terminated with isopropanol). The mixture was shaken for one minute and then transferred to a Waring blender and blended about one minute at high speed. The solution blend of polymer cement and silica slurry was then drum dried (SMB-1). The solids content of silica in the slurry was about 15% by weight, measured by weighing a sample of the slurry before and after drying.

A second sample of the solution masterbatch was prepared, as above, except that 4.5 wt % based on the silica of the surfactant sorbitan monooleate (SMO) was added to the stirring reactor with the Ciptane® LP and hexane. The resulting solution masterbatch was called SMB-2.

Example 2

Compounding of Rubber Using SMB-1 and SMB-2

The SMB-1 and SMB-2 prepared in Example 1 were compounded in a 300 gram Brabender mixer with the ingredients listed in Table 1. A comparison (C-1) dry mixed rubber compound using SBR and untreated powdered silica (Flo-gard® SP from PPG) was employed. The mean particle size of the Flo-gard® SP was 47.89 microns, with a median particle size of 37.92 microns. The coupling agent 3-mercaptopropyltrimethoxysilane was added to the comparison stock in the remill and was equivalent to the amount of coupling agent in the pretreated Ciptane® LP SMB-1 and SMB-2 compounds. The amount of silica dry mixed in the comparison compound was the same as the amount of silica in each of the SMB-1 and SMB-2 compounds.

The physical properties of each of the compounds are illustrated in Table 2. The SMB-1 green stock had a lower Mooney viscosity than the comparison dry mixed stock. Both the SMB-1 and SMB-2 stocks had a faster curing time than the comparison stock. Furthermore, the SMB-2 stock containing the surfactant SMO had a significantly faster curing time than the SMB-1 stock not containing the surfactant. In comparison to the dry mixed stock C-1, each of the cured SMB-1 and SMB-2 stocks had improved processability (Mooney viscosity), improved filler microdispersion (Payne effect, $\Delta G'$), increased rebound, and improved tensile and tear properties. The SMB-2 stock containing SMO showed an improved Lambourn wear rate and a significantly improved filler dispersion index than both the SMB-1 stock and the dry mix comparison stock.

TABLE 1

| Ingredient | Dry Mix Comparison C-1 - SBR + untreated powdered silica (phr) | SMB-1 (SBR + silane pre-treated powdered silica) (phr) | SMB-2 (SMB-1 + SMO) (phr) |
|---|---|---|---|
| Masterbatch 1 | | | |
| Styrene-butadiene rubber (SBR) | 100 | | |
| Silica | 50 | | |
| SMB-1 | | 150 | |
| SMB-2 | | | 150 |
| (SMB-1 + SMO) | | | |
| Aromatic Oil | 10 | 10 | 0 |
| Stearic Acid | 2 | 2 | 2 |
| Antioxidant[1] | 1 | 1 | 1 |
| Remill | | | |
| Silica coupling agent[2] | 1 | 0 | 0 |
| Final | | | |
| Zinc Oxide | 3 | 3 | 3 |
| DPG[3] | 0.5 | 0.5 | 0.5 |
| MBTS[4] | 1 | 1 | 1 |
| TBBS[5] | 1 | 1 | 1 |
| Sulfur | 1.3 | 1.3 | 1.3 |

[1]Santoflex 13
[2]3-Mercaptopropyl trimethoxysilane
[3]Diphenylguanidine
[4]2,2-Dibenzothiazole Disulfide
[5]N-Tertiary Butyl-2-Benzothiazole Sulfenamide

TABLE 2

| Property | Dry mix Comparison C-1 SBR + untreated powdered silica | SMB-1 (SBR + silane pre-treated powdered silica) | SMB-2 (SMB-1 + 4.5 wt % SMO) |
|---|---|---|---|
| Mooney Viscosity, $ML_{1+4}$ | 46.5 | 29.0 | 29.0 |
| Rheometer Curve | | | |
| MH (lb-in) | 34.46 | 17.14 | 18.37 |
| ML (lb-in) | 5.29 | 0.73 | 0.60 |
| $t_{90}$ (min.) | 27.99 | 26.48 | 21.80 |
| Bound Rubber(%) | | | |
| Masterbatch | 4.25 | 31.58 | 26.53 |
| Remill | 43.14 | 33.08 | 25.84 |
| Dispersion Index | 22.0 | 28.0 | 51.0 |
| Strain Sweep | | | |
| tan δ (7% strain), 60° C. | 0.171 | 0.151 | 0.143 |
| $\Delta G'$, 60° C. (MPa) | 2.737 | 0.303 | 0.397 |
| Wet Stanley-London | 66.0 | 67.0 | 65.0 |
| Lambourn Wear Rate | | | |
| 25% slip | 0.0854 | 0.0841 | 0.0802 |
| Pendulum Rebound | | | |
| 23° C. | 43.6 | 50.4 | 49.6 |
| 50° C. | 58.4 | 64.4 | 62.6 |
| Micro Dumbell Tensile | | | |
| 100% Modulus (MPa), 23° C. | 2.34 | 1.96 | 1.90 |
| 200% Modulus (MPa), 23° C. | 4.11 | 4.01 | 3.88 |

TABLE 2-continued

| Property | Dry mix Comparison C-1 SBR + untreated powdered silica | SMB-1 (SBR + silane pre-treated powdered silica) | SMB-2 (SMB-1 + 4.5 wt % SMO) |
|---|---|---|---|
| Tensile at break (MPa), 23° C. | 11.3 | 12.7 | 13.9 |
| Elong. at break (%), 23° C. | 567 | 589 | 629 |
| Toughness (MPa), 23° C. | 32.8 | 36.4 | 41.3 |
| 100% Modulus (MPa), 100° C. | 1.89 | 1.65 | 1.65 |
| Tensile at break (MPa), 100° C. | 5.57 | 5.18 | 6.41 |
| Elong. at break (%), 100° C. | 375 | 331 | 391 |
| Toughness (MPa), 100° C. | 11.5 | 8.8 | 12.4 |
| 100% Modulus (MPa), 170° C. | 2.10 | 1.82 | 1.79 |
| Tensile at break (MPa), 170° C. | 3.94 | 3.84 | 4.30 |
| Elong. at break (%), 170° C. | 233 | 227 | 264 |
| Toughness (MPa), 170° C. | 5.36 | 4.74 | 6.14 |
| Ring Tear at 100° C. | | | |
| Strength (kN/m) | 17.90 | 12.00 | 19.00 |
| Travel at tear % | 354 | 290 | 384 |

Example 3

Preparation of SMB-3 Containing an Untreated Powdered Silica and Compounding of Rubber Stocks SMB-3 was prepared by the method described in Example 1 for SMB-1. The silica employed was Flo-gard® SP, a powdered silica that has not been pre-treated with a silane. The SBR was quenched with isopropanol. After dispersing the silica in the organic solvent with the SBR, the mixture was steam desolventized to form SMB-3.

The SMB-3 was then used in a rubber compounding composition employing the ingredients illustrated in Table 3. Because no silane coupling agent was present in the SMB-3, Si69 was added in the remill stage. A dry mix comparison stock C-2 was prepared using the same SBR and an equivalent amount of untreated silica as present in the SMB-3.

TABLE 3

| Ingredient | Dry mix Comparison C-2 (phr) | SMB-3 (SBR + non-treated powdered silica) (phr) |
|---|---|---|
| Masterbatch 1 | | |
| Styrene-butadiene rubber (SBR)[1] | 100 | |
| Silica[2] | 45 | |
| SMB-3 (SBR/Flo-gard SP)[1,3] | | 145 |
| Aromatic Oil | 10 | 10 |
| Stearic Acid | 2 | 2 |
| Antioxidant[4] | 1 | 1 |
| Remill | | |
| Silica coupling agent[5] | 4.5 | 4.5 |
| Final | | |
| Zinc Oxide | 3 | 3 |
| DPG | 0.5 | 0.5 |
| MBTS | 1 | 1 |

TABLE 3-continued

| Ingredient | Dry mix Comparison C-2 (phr) | SMB-3 (SBR + non-treated powdered silica) (phr) |
|---|---|---|
| TBBS | 1 | 1 |
| Sulfur | 1.15 | 1.15 |

[1]Solution SBR quenched with isopropanol; base $ML_4$ = 38; Styrene = 20%; Vinyl = 56%, $M_n$ = 156 kg/mol; $T_g$ = −38.5° C.
[2]HiSil 190G
[3]Flo-gard SP, powdered untreated silica (PPG Industries)
[4]Santoflex 13
[5]Si69 (Degussa)

TABLE 4

| Property | Dry mix Comparison C-2 | SMB-3 (with untreated powdered silica and IPA-terminated SBR) |
|---|---|---|
| Mooney Viscosity, $ML_{1+4}$ | 25.55 | 20.03 |
| Bound Rubber(%) | | |
| Masterbatch | 13.05 | 14.15 |
| Strain Sweep @ 5% strain | | |
| tan δ @ 60° C. | 0.115 | 0.091 |
| tan δ @ 0° C. | 0.230 | 0.207 |
| ΔG', 30° C. (MPa) | 3.47 | 1.44 |
| Temp. Sweep | | |
| tan δ @ 60° C. | 0.111 | 0.107 |
| tan δ @ 0° C. | 0.224 | 0.248 |
| Wet Stanley-London | 62.4 | 64.4 |
| Lambourn Index | 100 | 114 |
| Pendulum Rebound | | |
| 50° C. | 64.8 | 68.8 |
| Dynastat tan δ @ 50° C. | 0.109 | 0.089 |
| Micro Dumbell Tensile | | |
| 100% Modulus (MPa), 23° C. | 2.70 | 2.21 |
| Elong. at break (%), 23° C. | 562 | 601 |

The properties of the rubber stocks are illustrated in Table 4. The rubber stocks containing the SMB-3 master batch (containing untreated powdered silica) demonstrated increased processability (reduced Mooney viscosity), improved filler microdispersion (Payne effect), increased bound rubber, increased Lambourn wear index, increased rebound and tensile properties, and reduced hysteresis. The SMB-3 stock also demonstrated a reduced tan δ at 60° C., indicative of reduced rolling resistance. The SMB-3 stock also demonstrated an 10 increased tan δ at 0° C., indicative of an increase in wet traction.

Example 4

Preparation of SMB-4 Containing a Silane-Treated Powdered Silica and Compounding of Rubber Stocks SMB-4 was prepared by the method described in Example 1 for SMB-1. The silica employed was Ciptane® LP, a powdered silica pre-treated with a mercaptosilane. The SBR was the same as that employed in example 3 and was terminated with isopropanol. After dispersing the silica in the organic solvent with the SBR, the mixture was steam desolventized to form SMB-4.

TABLE 5

| Ingredient | Dry mix Comparison C-3 SBR + silane pre-treated powdered silica (phr) | SMB-4 (SBR + silane treated powdered silica) (phr) | Dry mix Comparison C-4 SBR + silane pre-treated pelletized silica (phr) |
|---|---|---|---|
| Masterbatch 1 | | | |
| Styrene-butadiene rubber (SBR) | 100 | | 100 |
| Silica - Ciptane LP | 45 | | |
| SMB-4 - Ciptane LP | | 145 | |
| Silica - Ciptane TM | | | 45 |
| Aromatic Oil | 10 | 10 | 10 |
| Stearic Acid | 2 | 2 | 2 |
| Antioxidant | 1 | 1 | 1 |
| Remill | | | |
| Final | | | |
| Zinc Oxide | 3 | 3 | 3 |
| DPG | 0.5 | 0.5 | 0.5 |
| MBTS | 1 | 1 | 1 |
| TBBS | 1 | 1 | 1 |
| Sulfur | 2.7 | 2.7 | 2.7 |

TABLE 6

| Property | Dry mix Comparison C-3 SBR + silane pre-treated powdered silica | SMB-4 (SBR + silane treated powdered silica) | Dry mix Comparison C-4 SBR + silane pre-treated pelletized silica |
|---|---|---|---|
| Mooney Viscosity, $ML_{1+4}$ | 43.68 | 36.70 | 62.54 |
| Bound Rubber(%) | | | |
| Masterbatch | 36.21 | 36.78 | 21.95 |
| Strain Sweep | | | |
| tan δ @ 60° C. | 0.047 | 0.044 | 0.079 |
| tan δ @ 0° C. | 0.232 | 0.222 | 0.224 |
| ΔG', 30° C. (MPa) | 3.90 | 2.46 | 3.55 |
| Temp. Sweep | | | |
| tan δ @ 60° C. | 0.066 | 0.051 | 0.078 |
| tan δ @ 0° C. | 0.343 | 0.349 | 0.237 |
| Wet Stanley-London | 67.4 | 64.2 | 64.4 |
| Lambourn Wear Index | 100 | 131 | 87 |
| Pendulum Rebound | | | |
| 50° C. | 73.2 | 74.2 | 66.2 |
| Dynastat tan δ @ 50° C. | 0.049 | 0.045 | 0.079 |
| Micro Dumbell Tensile | | | |
| 100% Modulus (MPa), 23° C. | 3.10 | 2.53 | 3.21 |
| Elong. at break (%), 23° C. | 405 | 313 | 420 |

The SMB-4 was then used in a rubber compounding composition employing the ingredients illustrated in Table 5. Two dry mix comparison stocks C-3 and C-4 were prepared using the same SBR and an equivalent amount of Ciptane® LP and Ciptane® TM, respectively, as present in SMB-4. Ciptane® TM is a pelletized version of the silane treated powdered Ciptanes.

The properties of the rubber stocks are illustrated in Table 6. The rubber stocks containing the SMB-4 master batch (containing silane pre-treated powdered silica) demonstrated increased processability (reduced Mooney viscosity), reduced filler flocculation (Payne effect), increased bound rubber, improved Lambourn wear index, increased rebound and tensile properties, and reduced hysteresis, compared with dry mix stock C-3 containing the same silane pre-treated powdered silica, and dry mix stock C-4 containing the silane pre-treated pelletized silica. The properties of both the SMB-4 stock and the C-3 stock were improved over those of the C-4 pelletized silica stock, indicating that the powdered silica had better dispersion in the rubber than the pelletized silica. The SMB-4 stock also demonstrated a reduced tan δ at 60° C., indicative of reduced rolling resistance, compared with both dry mixed stocks. The SMB-4 stock also demonstrated an increased tan δ at 0° C., indicative of improved wet traction.

Example 5

Preparation of Solution MasterBatch (SMB-5) Using Functionalized Solution SBR Polymer Cement and Untreated Powdered Silica, and Compounding of Rubber Stocks 1000 grams of tetraethoxysilane (TEOS)-terminated solution SBR polymer cement in hexane (21.5% styrene, 55.6% vinyl, $T_g=-38.5°$ C., coupled $ML_4=83$) was mixed with 900 grams of Flo-gard® SP, a powdered silica that has not been pre-treated with a silane, in a one-gallon jar. The mixture was then transferred to a Waring blender and blended about one minute at high speed. The solution blend of polymer cement and silica was then steam desolventized (SMB-5).

The SMB-5 was then used in a rubber compounding composition employing the ingredients illustrated in Table 7. Because no silane coupling agent was present in the SMB-5, Si69 was added in the remill stage. A dry mix comparison stock C-5 was prepared using the same SBR and an equivalent amount of untreated silica as present in the SMB-5.

The properties of the rubber stocks are illustrated in Table 8. The rubber stocks containing the SMB-5 master batch (containing TEOS-functionalized SBR and untreated powdered silica) demonstrated reduced hysteresis in comparison with the dry mixed C-5 stock. The SMB-5 stock also demonstrated a reduced tan δ at 60° C., indicative of reduced rolling resistance. The SMB-5 stock also demonstrated an increase in G'@30° C. and a decrease in G'@-20° C., indicative of improved dry handling and snow traction, respectively.

TABLE 7

| Ingredient | Dry mix Comparison TEOS-terminated SBR, untreated powdered silica C-5 (phr) | SMB-3 (TEOS-terminated SBR + untreated powdered silica) (phr) |
|---|---|---|
| Masterbatch 1 | | |
| TEOS-SBR | 100 | |
| Silica (Flo-gard SP) | 45 | |
| SMB-3 (TEOS-SBR/Flo-gard SP) | | 145 |
| Aromatic Oil | 10 | 10 |
| Stearic Acid | 2 | 2 |
| Antioxidant | 1 | 1 |
| Remill | | |
| Silica coupling agent | 4.5 | 4.5 |
| Final | | |
| Zinc Oxide | 3 | 3 |
| DPG | 0.5 | 0.5 |

TABLE 7-continued

| Ingredient | Dry mix Comparison TEOS-terminated SBR, untreated powdered silica C-5 (phr) | SMB-3 (TEOS-terminated SBR + untreated powdered silica) (phr) |
|---|---|---|
| MBTS | 1 | 1 |
| TBBS | 1 | 1 |
| Sulfur | 1.15 | 1.15 |

[1]Si69 (Degussa)

TABLE 8

| Property | Dry mix Comparison TEOS-terminated SBR, untreated powdered silica C-5 (phr) | SMB-3 (TEOS-terminated SBR + untreated powdered silica) (phr) |
|---|---|---|
| Mooney Viscosity, $ML_{1+4}$ | 74.62 | 84.59 |
| Dispersion Rating % | 89.8 | 88.1 |
| Wet Stanley-London | 62.2 | 63.2 |
| Lambourn Index | 100 | 95 |
| Pendulum Rebound | | |
| 50° C. | 72.4 | 72.6 |
| Temp. Sweep | | |
| tan δ @ 60° C. | 0.077 | 0.066 |
| tan δ @ 0° C. | 0.338 | 0.308 |
| G'@ 30° C. (MPa) | 3.64 | 3.87 |
| G' @ -20° C. (MPa) | 62.6 | 61.3 |
| Dynastat tan δ @ 50° C. | 0.069 | 0.067 |
| Micro Dumbell Tensile | | |
| 100% Modulus (MPa), 23° C. | 2.38 | 2.78 |
| Elong. at break (%), 23° C. | 524 | 420 |

Example 6

Preparation of Solution MasterBatch (SMB-6) Using Functionalized Solution SBR-Polymer Cement and Silane Pre-treated Powdered Silica, and Compounding of Rubber Stocks SMB-6 was prepared by the method described in Example 5 for SMB-5. The SBR was TEOS-functionalized SBR. The silica employed was Ciptane® LP, a powdered silica pre-treated with a mercaptosilane. After dispersing the silica in the organic solvent with the TEOS-SBR, the mixture was steam desolventized to form SMB-6.

The SMB-6 was then used in a rubber compounding composition employing the ingredients illustrated in Table 9. Two dry mix comparison stocks C-6 and C-7 were prepared using the same TEOS-SBR and an equivalent amount of Ciptane® LP and Ciptane® TM, respectively, as present in SMB-6. Ciptane® TM is a pelletized version of the silane treated powdered Ciptanes.

The properties of the rubber stocks are illustrated in Table 10. The rubber stocks containing the SMB-6 masterbatch (containing TEOS-terminated SBR and silane pre-treated powdered silica) and the dry mix comparison stock C6 demonstrated increased processability (reduced Mooney viscosity), increased rebound and reduced hysteresis, compared with dry mix stock C-7 containing the silane pre-treated pelletized silica, indicating that the powdered silica had better dispersion in the rubber than the pelletized silica. The properties of the SMB-6 stock were improved over those of the C-6 dry mix stock. The SMB-6 stock also demonstrated a reduced tan δ at 60° C., indicative of reduced rolling resistance, compared with both dry mixed stocks. The SMB-6 stock and the dry mix C-6 comparison stock also demonstrated an increased tan δ at 0° C., indicative of improved wet traction, and a decrease in G' at −20° C., indicative of improved snow traction. This example illustrates the improved physical properties obtained by using a silane pre-treated powdered silica over a silane pre-treated pelletized silica.

TABLE 9

| Ingredient | Dry mix Comparison C-6 TEOS-SBR + silane pre-treated powdered silica (phr) | SMB-6 (TEOS-SBR + silane pre-treated powdered silica) (phr) | Dry mix Comparison C-7 TEOS-SBR + silane pre-treated pelletized silica (phr) |
|---|---|---|---|
| Masterbatch 1 | | | |
| TEOS-SBR | 100 | | 100 |
| Silica - Ciptane LP | 45 | | |
| SMB-4 - Ciptane LP | | 145 | |
| Silica - Ciptane TM | | | 45 |
| Aromatic Oil | 10 | 10 | 10 |
| Stearic Acid | 2 | 2 | 2 |
| Antioxidant | 1 | 1 | 1 |
| Remill | | | |
| Final | | | |
| Zinc Oxide | 3 | 3 | 3 |
| DPG | 0.5 | 0.5 | 0.5 |
| MBTS | 1 | 1 | 1 |
| TBBS | 1 | 1 | 1 |
| Sulfur | 2.7 | 2.7 | 2.7 |

Example 7

Preparation of Rubber Compounds Including Solution Masterbatches and Nanoparticle Fillers A. Synthesis of Polymeric Nanoparticle Fillers In a 2-gallon stainless steel reactor, 2.52 kg. of hexane, 104.5 grams of a styrene blend (33 wt % in hexane) and 0.64 kg of butadiene blend (21.5 wt % in hexane) were charged. The batch was then warmed to 49° C. and n-butyl lithium (4.4 mL of 1.54 M in hexane) and OOPS modifier, (1.4 mL of 1.60 M in hexane) were added. After 1.75 hours, the jacket of the reactor was brought to 66° C. A sample was dropped for analysis and 1.04 kg of styrene blend was added to the mixture. An exotherm peak was observed at 70° C. after 6 minutes. Another sample was dropped for analysis 45 minutes after the exotherm peak. Then 50 mL of divinylbenzene (80%) were added. After two hours, the reactor was cooled down and the cement was dropped in two one-gallon jars.

The SBR shell had the following characteristics: $M_p$-21.2 kg/mol, 24.3% styrene, 57.8% vinyl. The styrene block had a $M_p$ of 44.6 kg/mol. The final product displayed 82% of coupled polymer micelles ($M_p$=806 kg/mol), the remainder of the polymer being uncoupled diblocks.

B. Steam Desolventization of Nanoparticle Polymeric Filler

The cement of polymeric filler from A above, was 12.20 wt % of solids. 205 grams of the cement was steam desolventized to remove the hexane. The operating temperature was 75° C. to 80° C. The wet crumb was collected and then heated in a vacuum oven to remove the water. The dried crumb was a powder.

C. Preparation of Solution Masterbatch (SMB-7) Containing Multiple Fillers 90.2 grams of the polymeric filler cement from A was added to 564.1 grams of SBR cement, along with 49.5 grams of Ciptane® LP. The SBR had 19.5 wt % of solids, $ML_4$ of 35.7, vinyl 57.8% and styrene 21.3%. After blending, the wet mixture was steam desolventized. The wet crumb was

TABLE 10

| Property | Dry mix Comparison C-6 TEOS-SBR + silane pre-treated powdered silica | SMB-6 (TEOS-SBR + silane pre-treated powdered silica) | Dry mix Comparison C-7 TEOS-SBR + silane pre-treated pelletized silica |
|---|---|---|---|
| Mooney Viscosity, $ML_{1+4}$ | 104.0 | 110.0 | 150.0 |
| Dispersion Rating % | | | |
| Temp. Sweep | | | |
| tan δ @ 60° C. | 0.050 | 0.048 | 0.064 |
| tan δ @ 0° C. | 0.459 | 0.409 | 0.345 |
| G'@ 30° C. (MPa) | 2.64 | 3.05 | 5.10 |
| G' @ −20° C. (MPa) | 99.3 | 96.1 | 110 |
| Wet Stanley-London | 64.0 | 62.0 | 65.0 |
| Lambourn Index | 100 | 96 | 91 |
| Pendulum Rebound | | | |
| 50° C. | 75.8 | 74.2 | 71.8 |
| Dynastat tan δ @ 50° C. | 0.041 | 0.048 | 0.056 |
| Micro Dumbell Tensile | | | |
| 100% Modulus (MPa), 23° C. | 3.04 | 3.43 | 3.14 |
| Elong. at break (%), 23° C. | 332 | 262 | 385 | heated in a vacuum oven to remove the water. The dried SMB-7 contained 100 parts SBR, 10 phr polymeric filler, and 45 phr of Ciptane® LP.

D. Preparation of Comparison Solution Masterbatch (SMB-8) Containing Ciptane® LP 90 grams of Ciptane® LP was added to 1026 grams of SBR cement. After blending, the wet mixture was steam-desolventized. The wet crumb was heated in a vacuum oven to remove the water. The dried crumb had a content of 100 parts SBR and 45 phr of Ciptane® LP.

Example 8

Compounding of Solution Masterbatches Containing Ciptane® LP and/or Multiple Fillers SMB-7 containing Ciptane® LP and the polymeric filler prepared in Example 7C was compounded in a 65 gram Brabender mixer. As a comparison, SMB-8 containing Ciptane® LP was compounded in a dry mix with the polymeric filler prepared in Example 7A. The ingredients in the compounding mixture are illustrated in Table 11.

The properties of the rubber stocks are illustrated in Table 12. The SMB-7 stock containing the multiple filters has improved processability (low Mooney viscosity).

Figure 1:
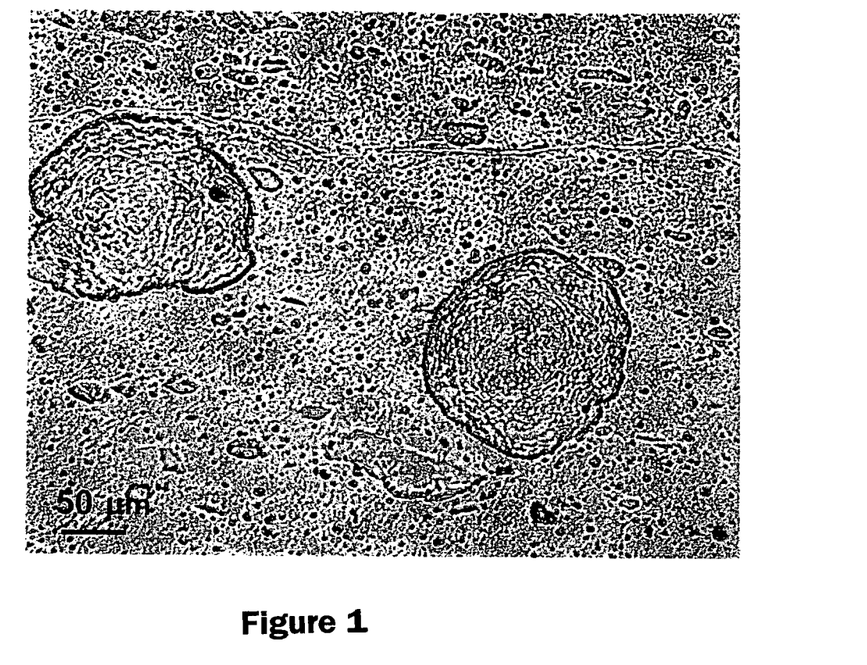
FIG. 1 illustrates an optical micrograph of the dispersion of silica and polymer nanoparticles in the cured SMB-8 rubber, according to Example 8, where the SMB-8 was mixed with the polymer nanoparticles in a dry mix. This is a comparison stock to that illustrated in FIG. 2.
Figure 2:
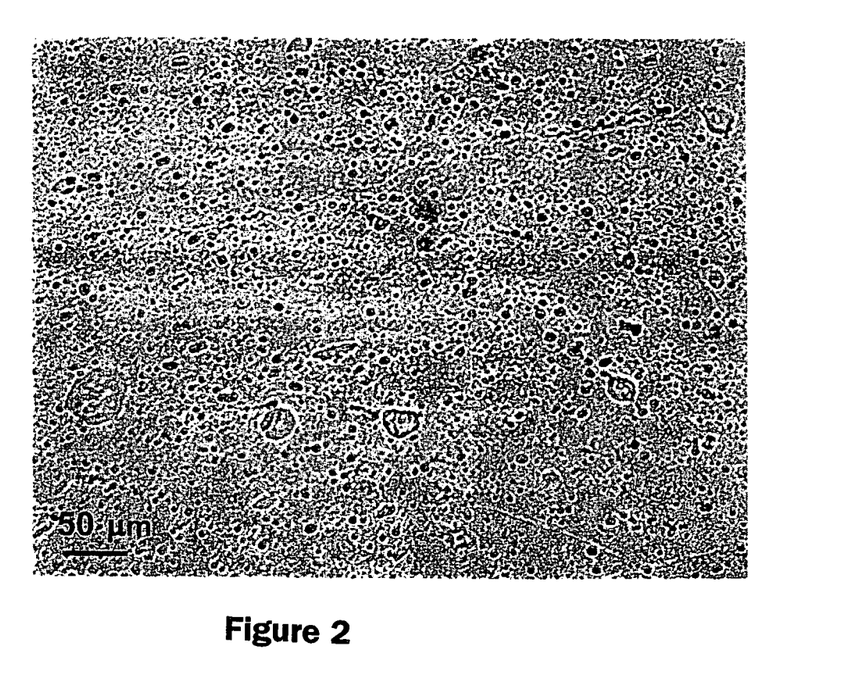
FIG. 2 illustrates an optical micrograph of the dispersion of silica and polymer nanoparticles in the cured SMB-7 rubber, according to Example 8, where the SMB-7 was mixed with both silica and polymer nanoparticles in the solution masterbatch.

Optical micrographs of samples of the compounds employing SMB-8 and SMB-7, showing polymeric filler dispersion, are illustrated in FIGS. 1 and 2, respectively. It is clear from the Figures that the dispersion of the polymeric filler in the solution masterbatch SMB-7 containing the filler is considerably improved, compared to the SMB-8 masterbatch dry mixed with the filler.

TABLE 11

| Ingredient | Dry mix Comparison SMB-8 (SBR + silane pre-treated powdered silica) (phr) | SMB-7 (SBR + silane treated powdered silica + polymeric nanofiller) (phr) |
|---|---|---|
| Masterbatch 1 | | |
| SMB-8 - Ciptane LP | 145 | |
| SMB-7 - Ciptane LP + polymeric filler | | 155 |
| Polymeric Filler | 10 | |
| Aromatic Oil | 10 | 10 |
| Stearic Acid | 2 | 2 |
| Antioxidant | 1 | 1 |
| Remill | | |
| Final | | |
| Zinc Oxide | 3 | 3 |
| DPG | 0.5 | 0.5 |
| MBTS | 1 | 1 |
| TBBS | 1 | 1 |
| Sulfur | 1.3 | 2.7 |

TABLE 12

| Property | Dry mix Comparison SMB-8 (SBR + silane pre-treated powdered silica) | SMB-7 (SBR + silane treated powdered silica + polymeric nanofiller) |
|---|---|---|
| Mooney Viscosity, $ML_{1+4}$ | 51.32 | 45.97 |
| Dynastat | | |
| tan δ @ 23° C. | 0.143 | 0.114 |
| tan δ @ 50° C. | 0.142 | 0.093 |
| Temp. Sweep | | |
| tan δ @ 60° C., 2% strain | 0.157 | 0.109 |
| tan δ @ 0° C., 0.5% strain | 0.215 | 0.261 |
| G'@ 30° C., 2% strain, MPa | 6.67 | 6.87 |
| Strain Sweep | | |
| tan δ @ 60° C., 2% strain | 0.150 | 0.093 |
| tan δ @ 0° C., 2% strain | 0.200 | 0.238 |
| G' @ 60° C., 2% strain, MPa | 3.332 | 3.174 |
| ΔG' @ 60° C., MPa, 0.25%-14.75% | 1.508 | 1.128 |
| G' @ 0° C., 2% strain, MPa | 6.435 | 5.797 |
| ΔG' @ 0° C., MPa, 0.25%-14.75% | 3.590 | 2.850 |
| Micro Dumbell Tensile | | |
| 100% Modulus MPa, 23° C. | 2.89 | 3.56 |
| 200% Modulus MPa, 23° C. | 4.97 | 6.77 |
| Tensile at break, MPa | 8.5 | 12.4 |
| Elong. at break (%), 23° C. | 383 | 353 |

Example 9

Comparison of Volatile Organic Compound (VOC) Release from Rubber Compounds Prepared with SMBs To compare the amount of VOC released from rubber compounds prepared with SMBs containing silane pre-treated silicas mixed with SBR cement, and SMBs containing non-treated silicas and a silica coupling agent mixed with SBR cement, SMB-9 through SMB-13 were prepared similarly to the method described in Example 1 for SMB-1. The silicas employed were Coupsil® 8113, that is the product of the reaction between organosilane Bis(triethoxysilylpropyl) polysulfide (Si69) and Ultrasil® VN3; Ultrasil® VN3; Ciptane® LP, a powdered silica pre-treated with a mercaptosilane; and Flo-Gard® SP, an untreated powdered silica, respectively, as illustrated in Table 13 below. The SBR was polymerized and terminated with isopropanol to form the SBR cement in organic solvent. To the SMBs containing the untreated silicas, Si69 was added with the silicas to the SBR cement, in the amounts indicated in Table 13.

After adding the respective silicas with and without added Si69 to the organic solvent with the SBR cement, the mixtures were stirred at room temperature for six hours before vacuum drying at 50° C., to form SMB-9, SMB-10, SMB-11, SMB-12 and SMB-13, respectively.

The amount of alcohol recoverable from each of the SMBs was measured according to the method published in Rubber Chemistry & Technology 75, 215 (2001). Briefly, a sample of the product was treated by total acid hydrolysis using a siloxane hydrolysis reagent (0.2 N toluenesulfonic acid /0.24 N water/15% n-butanol/85% toluene). This reagent quantitatively reacts with residual ethoxysilane (EtOSi) or methoxysilane (MeOSi), freeing a substantially total amount of ethanol or methanol that is then measured by a headspace/gas chromatographic technique, and expressed as the percentage by weight in the sample.

The results, illustrated in Table 13, show the amount of alcohol potentially available for release into the environment as VOC during compounding and subsequent processing.

TABLE 13

| | SBR (phr) | Silica (phr) | Si69 (phr) | MeOH wt % | EtOH wt % | total VOC | Total —OH wt % |
|---|---|---|---|---|---|---|---|
| SMB-9 | 100 | 100 Coupsil® 8113 | 0 | 0.0054 | 0.3310 | 0.3364 | 0.1253 |
| SMB-10 | 100 | 100 Ultrasil® VN3 | 15 | 0.0093 | 3.3500 | 3.3593 | 1.2444 |
| SMB-11 | 100 | 100 Ciptane® LP | 0 | 0.1040 | 0.0362 | 0.1402 | 0.0686 |
| SMB-12 | 100 | 100 Flo-gard® SP | 10 | 0.0034 | 2.1600 | 2.1634 | 0.8010 |
| SMB-13 | 100 | 100 Flo-gard® SP | 5 | 0.0014 | 1.0500 | 1.0514 | 0.3892 |

The results show that the SMBs with silane pre-treated silicas (Coupsil® 8113 and Ciptane® LP) have significantly lower alcohol contents. The total reduction in potentially releasable VOCs by using the pre-treated silicas is about 90%. Therefore, the use of the silane pre-treated silicas in the SMBs is advantageous in reducing environmental $VOC_5$ in the production of rubber compounds and subsequent alcohol release during further processing of the compounds. The use of these SMBs will improve the production of rubber compounds and tires and decrease costs.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A method for making a solution masterbatch containing a diene elastomer in an organic solvent and a reinforcing silica filler and a polymeric nanoparticle filler dispersed therein, comprising the steps of:
   (a) mixing a precipitated silica having an average particle size substantially equivalent to an average particle size of a powdered silica, with a diene elastomer and a polymeric nanoparticle filler in a first organic solvent; and
   (b) desolventizing the mixture to form a solution masterbatch preparation.

2. The method of claim 1, wherein the average particle size of the precipitated silica is about 20 to about 200 microns.

3. The method of claim 2, wherein the average particle size of the precipitated silica is about 30 to about 100 microns.

4. The method of claim 1, wherein the precipitated silica is selected from the group consisting of ground pelletized silica, ground granulated silica, powdered silica, and mixtures thereof.

5. The method of claim 4, wherein the precipitated silica comprises powdered silica.

6. The method of claim 1, wherein the precipitated silica in step (a) is pre-treated with a silica coupling agent.

7. The method of claim 6, wherein the silica coupling agent comprises an organosiloxane.

8. The method of claim 1, wherein the diene elastomer contains a terminal functional group that can react with the silica.

9. The method of claim 1, wherein step (a) comprises the substeps of (i) mixing the precipitated silica with a second organic solvent to form a silica slurry; and (ii) mixing the silica slurry with the diene elastomer in the first organic solvent.

10. The method of claim 9, wherein the first and second organic solvents are the same or different.

11. The method of claim 1, wherein the silica in the solution masterbatch preparation is present in an amount of about 10 phr to about 120 phr by weight.

12. The method of claim 11, wherein the silica in the solution masterbatch preparation is present in an amount of about 20 phr to about 85 phr.

13. The method of claim 1, wherein step (a) includes the substep of mixing the silica, the diene elastomer and the polymeric nanoparticle filler with additional ingredients prior to the desolventizing step (b).

14. The method of claim 13, wherein the additional ingredients are selected from the group consisting of one or more additional fillers, a surfactant, one or more additional rubbers and mixtures thereof.

15. The method of claim 14, wherein the additional fillers are selected from the group consisting of reinforcing fillers, non-reinforcing fillers, polymer microparticle fillers, nanoparticle fillers, and mixtures thereof.

16. The method of claim 15, wherein the additional reinforcing filler comprises carbon black.

17. The method of claim 9, wherein step (a)(i) further comprises the substep of mixing the polymeric nanoparticle filler with the silica to form a silica slurry containing the polymeric nanoparticle filler.

18. The method of claim 9, wherein step (a)(ii) further comprises the substep of pre-mixing the polymeric nanoparticle filler with the diene elastomer.

19. The method of claim 9, wherein step (a)(i) further comprises the substep of mixing at least a portion of the polymeric nanoparticle filler with the silica to form a silica slurry containing the polymeric nanoparticle filler; and step (a)(ii) further comprises the substep of pre-mixing at least a portion of the polymeric nanoparticle filler with the diene elastomer.

20. A method for making a solution masterbatch containing a diene elastomer in an organic solvent and a reinforcing silica filler and a polymeric nanoparticle filler dispersed therein, comprising the steps of:
  (a) mixing a precipitated silica having an average particle size substantially equivalent to an average particle size of a powdered silica, with a diene elastomer and a polymeric nanoparticle filler in a first organic solvent, wherein the silica is pre-treated with a silica coupling agent; and
  (b) desolventizing the mixture to form a solution masterbatch preparation.

21. The method of claim 20, wherein the average particle size of the pre-treated precipitated silica is about 20 to about 200 microns.

22. The method of claim 21, wherein the average particle size of the pre-treated precipitated silica is about 30 to about 100 microns.

23. The method of claim 20, wherein the precipitated silica is selected from the group consisting of pre-treated ground pelletized silica, pre-treated ground granulated silica, pre-treated powdered silica, and mixtures thereof.

24. The method of claim 23, wherein the precipitated silica comprises pre-treated powdered silica.

25. The method of claim 20, wherein the silica coupling agent comprises an organosiloxane.

26. The method of claim 20, wherein the diene elastomer contains a terminal functional group that can react with the silica.

27. The method of claim 20, wherein the mixing steps include the substep of mixing the pre-treated silica, the diene elastomer and the polymeric nanoparticle filler with additional ingredients prior to the desolventizing step.

28. The method of claim 27, wherein the additional ingredients are selected from the group consisting of one or more additional fillers, a surfactant, one or more additional rubbers and mixtures thereof.

29. The method of claim 28, wherein the additional fillers are selected from the group consisting of reinforcing fillers, non-reinforcing fillers, polymer microparticle fillers, nanoparticle fillers, and mixtures thereof.

30. The method of claim 29, wherein the additional reinforcing filler comprises carbon black.

31. The method of claim 20, wherein step (a) comprises the substeps of (i) mixing the pre-treated silica with a second organic solvent to form a pre-treated silica slurry; and (ii) mixing the pre-treated silica slurry with the diene elastomer in the first organic solvent.

32. The method of claim 31, wherein step (a)(i) further comprises the substep of mixing the polymeric nanoparticle filler with the pre-treated silica to form a pre-treated silica slurry containing the polymeric nanoparticle filler.

33. The method of claim 31, wherein step (a)(ii) further comprises the substep of pre-mixing the polymeric nanoparticle filler with the diene elastomer.

34. The method of claim 31, wherein step (a)(i) further comprises the substep of mixing at least a portion of the polymeric nanoparticle filler with the pretreated silica to form a silica slurry containing the polymeric nanoparticle filler; and step (a)(ii) further comprises the substep of pre-mixing at least a portion of the polymeric nanoparticle filler with the diene elastomer.

35. A vulcanizable rubber compound having improved silica dispersion, comprising:
  (a) a desolventized solution masterbatch comprising a diene elastomer optionally having a terminal functional group that can react with silica, a precipitated silica having an average particle size substantially equivalent to an average particle size of a powdered silica dispersed therein wherein the precipitated silica is optionally pre-treated with a silica coupling agent, and a polymeric nanoparticle filler;
  (b) optionally an additional elastomer, wherein the total amount of the diene elastomer in the solution masterbatch plus the optional additional elastomer is 100 parts;
  (c) optionally an additional reinforcing filler;
  (d) optionally a process oil; and
  (e) a cure agent.

36. The vulcanizable rubber compound of claim 35, wherein the amount of the silica in the solution masterbatch is about 10 phr to about 120 phr.

37. The vulcanizable rubber compound of claim 35, wherein the optional additional reinforcing filler is selected from the group consisting of precipitated silica, carbon black, clay, polymer microparticles, polymer nanoparticles, nanoparticles, and combinations thereof.

38. A tire comprising at least one component that comprises the vulcanizable rubber compound of claim 35.

* * * * *